(12) United States Patent
Liao et al.

(10) Patent No.: US 8,192,625 B2
(45) Date of Patent: Jun. 5, 2012

(54) JET AERATION APPARATUS AND METHOD OF USING THE SAME

(75) Inventors: Zhimin Liao, Shenzhen (CN); Jianzhong Xiong, Shenzhen (CN); Shengyun Yang, Shenzhen (CN); Jialin Zhou, Shenzhen (CN); Xingfu Jiang, Shenzhen (CN); Lingyun He, Shenzhen (CN); Qihu He, Shenzhen (CN); Dejin Ju, Shenzhen (CN); Aiguo Wan, Shenzhen (CN); Zhihua Yuan, Shenzhen (CN); Jiejun Cao, Shenzhen (CN); Kun Tao, Shenzhen (CN)

(73) Assignee: Jiangxi JDL Environmental Protection Research Ltd., Nanchang (CN)

( * ) Notice: Subject to any disclaimer, the term of this patent is extended or adjusted under 35 U.S.C. 154(b) by 253 days.

(21) Appl. No.: 12/552,541

(22) Filed: Sep. 2, 2009

(65) Prior Publication Data
US 2010/0224556 A1    Sep. 9, 2010

(30) Foreign Application Priority Data
Mar. 9, 2009  (CN) .......................... 2009 1 0115021

(51) Int. Cl.
*C02F 3/00* (2006.01)

(52) U.S. Cl. ........ 210/620; 210/622; 210/220; 210/150; 210/151; 210/797; 210/791

(58) Field of Classification Search .......... 210/150–151, 210/220, 620–622, 791, 797
See application file for complete search history.

(56) References Cited

U.S. PATENT DOCUMENTS

| | | | |
|---|---|---|---|
| 6,361,695 B1 * | 3/2002 | Husain et al. | 210/614 |
| 6,984,325 B1 * | 1/2006 | Venable | 210/621 |
| 7,396,453 B1 * | 7/2008 | Probst | 210/150 |
| 7,625,484 B2 * | 12/2009 | Yamasaki et al. | 210/150 |
| 2008/0041783 A1 * | 2/2008 | Barnes | 210/605 |

* cited by examiner

*Primary Examiner* — Chester Barry
(74) *Attorney, Agent, or Firm* — Matthias Scholl P.C.; Matthias Scholl

(57) ABSTRACT

A jet aeration apparatus for aerating a membrane bioreactor has a jet aerator and an air supply pipe. The jet aerator is disposed in the membrane bioreactor and includes a water inlet, a pump disposed below a liquid surface of the membrane bioreactor, an air inlet pipe whose air inlet is disposed above the liquid surface of the membrane bioreactor, and a jet pipe having a jet nozzle. The air supply pipe includes a connector; and the connector of the air supply pipe is connected to the jet nozzle of the jet pipe of the jet aerator. A method of using the jet aeration apparatus is also provided. The jet aeration apparatus is easy to install, quiet in operation, and features a high degree of integration.

13 Claims, 2 Drawing Sheets

JET AERATION APPARATUS AND METHOD OF USING THE SAME

CROSS-REFERENCE TO RELATED APPLICATIONS

Pursuant to 35 U.S.C. §119 and the Paris Convention Treaty, this application claims the benefit of Chinese Patent Application No. 200910115021.7 filed Mar. 9, 2009, the contents of which are incorporated herein by reference.

BACKGROUND OF THE INVENTION

1. Field of the Invention

The invention relates to a jet aeration apparatus and a method of using the same for aeration.

2. Description of the Related Art

Highly efficient and suitable aeration system is an important factor for stable operation of a membrane bioreactor. Currently, most membrane bioreactor is coupled with an external blower. For a blower aeration system, the oxygen utilization rate is merely 6-7%, and other disadvantages such as high energy consumption, big noise, and low degree of integration are also obvious.

SUMMARY OF THE INVENTION

Therefore, in view of the above-described problems, it is one objective of the invention to provide a jet aeration apparatus for aerating a membrane bioreactor and having low energy consumption and high oxygen utilization rate.

It is another objective of the invention to provide a method of using the jet aeration apparatus for a membrane bioreactor and having low energy consumption and high oxygen utilization rate.

To achieve the above objectives, in accordance with one embodiment of the invention, there is provided a jet aeration apparatus for aerating a membrane bioreactor and comprising a jet aerator and an air supply pipe; the jet aerator is disposed in the membrane bioreactor and comprises a water inlet, a pump disposed below a liquid surface of the membrane bioreactor, an air inlet pipe whose air inlet is disposed above the liquid surface of the membrane bioreactor, and a jet pipe comprising a jet nozzle; the air supply pipe is disposed below a membrane module of the membrane bioreactor and comprises a connector; and the connector of the air supply pipe is connected to the jet nozzle of the jet pipe.

A mixture comprising air, liquid, solid, and microorganisms in the membrane bioreactor is pumped by the jet aerator, sprayed from the jet pipe, transported by the air supply pipe, and scouring against the follow fiber membrane module. On the one hand, the jet aeration apparatus provides oxygen for microorganisms, resulting in a highly increased oxygen utilization rate, on the other hand, the apparatus produces a stirring effect during scouring.

In a class of this embodiment, the pump is disposed between the membrane modules or at the side of the membrane module.

In a class of this embodiment, an air intake amount of the air inlet pipe is controlled by a ball valve.

In a class of this embodiment, the water inlet is lower than a set low liquid level of the membrane bioreactor. A negative pressure is formed due to the high speed liquid flow in the pump, and thereby air is sucked in, mixed with liquid and solid in the jet pipe to form a mixture. The mixture is sprayed from the jet pipe into the air supply pipe.

In a class of this embodiment, the air supply pipe further comprises a branch pipe and a drain pipe, the branch pipe having equal length and being disposed below the membrane module, and both ends of the drain pipe being closed and each side being connected to the branch pipe.

In a class of this embodiment, the branch pipe is disposed in an equal interval.

In a class of this embodiment, one end of the branch pipe is closed and the other end is connected to the drain pipe, and a line of aeration holes is disposed at both sides of the branch pipe, and an angle between the aeration hole and vertical line is ±44°-46°.

In a class of this embodiment, a diameter of the aeration hole is 4-10 mm.

In a class of this embodiment, the aeration hole is disposed 100-500 mm below the bottom of the membrane module.

In a class of this embodiment, a distance between two aeration holes is 100-300 mm.

In a class of this embodiment, the branch pipe is a corrosion resistant pipe.

In a class of this embodiment, the drain pipe is a corrosion resistant pipe.

In a class of this embodiment, the connector is a corrosion resistant connector.

In accordance with another embodiment of the invention, there is provided a method of aeration by use of the jet aeration apparatus, the method comprising the steps of:
a) pumping sludge and wastewater into the pump of the jet aerator to form a high speed of mixture flow so that a negative pressure are produced in the jet pipe;
b) controlling an air-water ratio of 4-15:1 to make air sucked in to the jet pipe due to the negative pressure to form a mixture comprising air, wastewater, and sludge; and
c) transporting the mixture via the air supply pipe and scouring against the membrane module.

Advantages of the invention are summarized below:
1) the mixture comprising air, liquid, solid, and microorganisms is pumped by the jet aerator and sprayed from the jet pipe, so the oxygen is mixed with water completely, the contact time of the oxygen and microorganisms is significantly prolonged, and the oxygen transfer rate is improved by 35% compared to that of a blower aeration system;
2) during scouring against the membrane module, the stirring with air, sludge, and water effectively prevents the pollution; and
3) the jet aerator of the invention is easy for installation, even can be installed directly in the membrane region, and has a high degree of integration, small noise, and take up a small area.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, embodiments detailing a jet aeration apparatus for aerating a membrane bioreactor and a method of using the jet aeration are described below. It should be noted that the following embodiments are intended to describe but not to limit the invention.

Embodiment 1

Figure 1:
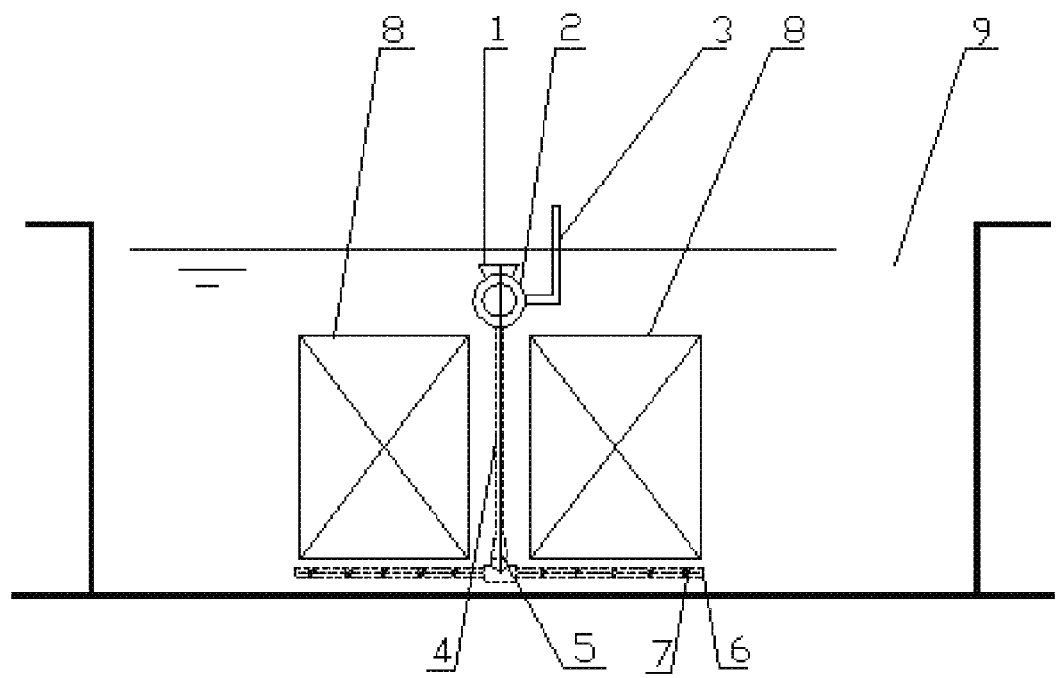
FIG. 1 is a schematic diagram of a jet aeration apparatus in accordance with one embodiment of the invention.
Figure 2:
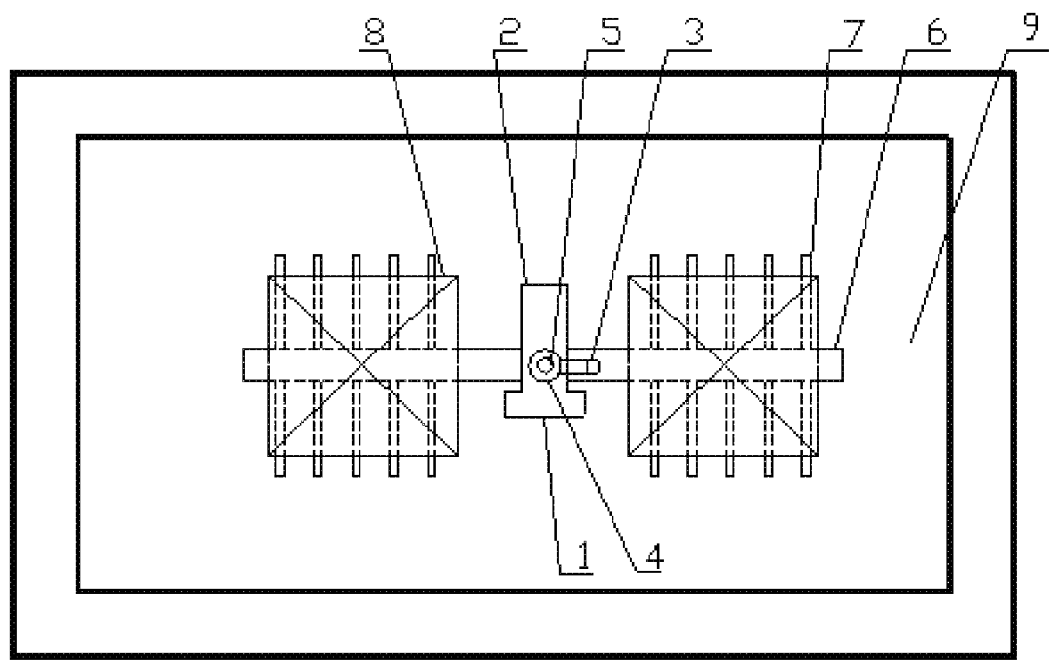
FIG. 2 is a top view of the jet aeration apparatus of FIG. 1.

As shown in FIGS. 1 and 2, a jet aeration apparatus for aerating a membrane bioreactor 9 and having low energy consumption, comprises a jet aerator and an air supply pipe. The jet aerator is disposed between the separate hollow fiber membrane module 8 in the membrane bioreactor, and comprises a water inlet 1, a pump 2 disposed below a liquid surface of the membrane bioreactor 9, an air inlet pipe 3 whose air inlet is disposed above the liquid surface of the membrane bioreactor, and a jet pipe 4 comprising a jet nozzle. The air supply pipe is disposed below a membrane module of the membrane bioreactor and comprises a corrosion resistant connector 5. The corrosion resistant connector 5 of the air supply pipe is connected to the jet nozzle of the jet pipe 4. The water inlet 1 of the jet aerator is lower than a set low liquid level of the membrane bioreactor. Sludge and wastewater are pumped into the pump 2 of the jet aerator to form a high speed of mixture flow so that a negative pressure are produced in the jet pipe 4, and then air is sucked in to form a mixture containing air, liquid, solid, and microorganisms. The mixture is sprayed from the jet pipe 4 and scours against the membrane module.

The air supply pipe comprises a corrosion resistant branch pipe 7 and a corrosion resistant drain pipe 6. The corrosion resistant branch pipe 7 has equal length and is disposed in equal interval and below the membrane module. Both ends of the corrosion resistant drain pipe 6 are closed and each side is connected to the corrosion resistant branch pipe 7. One end of the corrosion resistant branch pipe 7 is closed and the other end is connected to the corrosion resistant drain pipe 6, and a line of aeration holes is disposed at both sides of the corrosion resistant branch pipe 7, and an angle between the aeration hole and vertical line is ±45°. A diameter of the aeration hole is 6 mm. The aeration hole is disposed 300 mm below the bottom of the hollow fiber membrane module 8. A distance between two aeration holes is 200 mm.

A method of aeration by use of the jet aeration apparatus, comprises:

a) pumping sludge and wastewater from the water inlet 1 into the pump 2 of the jet aerator to form a high speed of mixture flow so that a negative pressure are produced in the jet pipe 4;

b) making air sucked in to the jet pipe 4 due to the negative pressure to form a mixture comprising air, wastewater, and sludge; and c) transporting the mixture via the corrosion resistant drain pipe 6 and the corrosion resistant branch pipe 7 and scouring against the hollow fiber membrane module 8.

Two aeration experiments were made by the jet aeration apparatus of the invention and a conventional blower respectively. The jet aerator of the invention is disposed between the hollow fiber membrane modules 8 in a dispersed sewage treatment and recycling tank with capacity of 50 T/d, the air-water ratio is 10:1, and the CODcr of the to-be-treated water is 250 mg/L. The result is listed below:

| Items | Jet aeration | Blower aeration |
|---|---|---|
| Effluent CODcr (mg/L) | 20 | 30 |
| Cost of electricity consumption (RMB/T) | 0.15 | 0.3 |
| Effluent flux (m³/m² · d) | 0.24 | 0.20 |
| Cleaning cycle of membrane (Month) | 3 | 2.5 |

Embodiment 2

Figure 3:
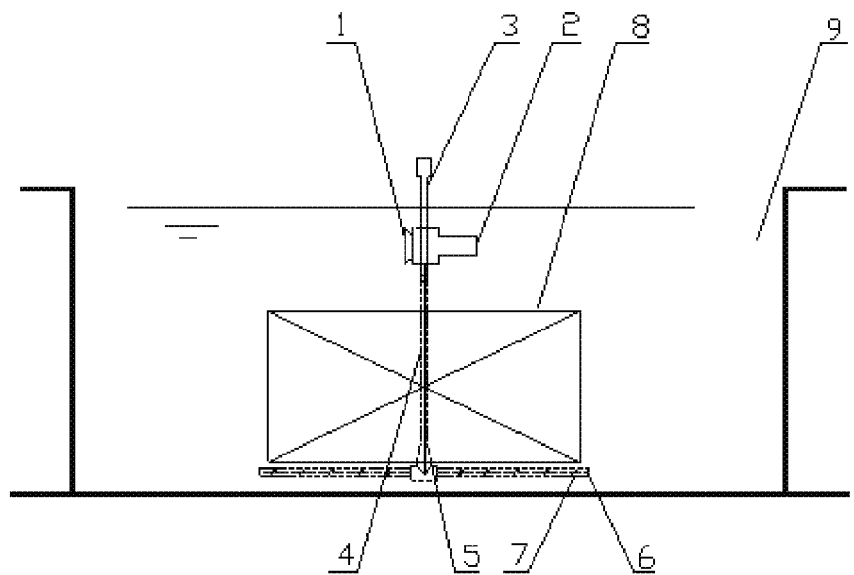
FIG. 3 is a schematic diagram of another jet aeration apparatus in accordance with one embodiment of the invention.
Figure 4:
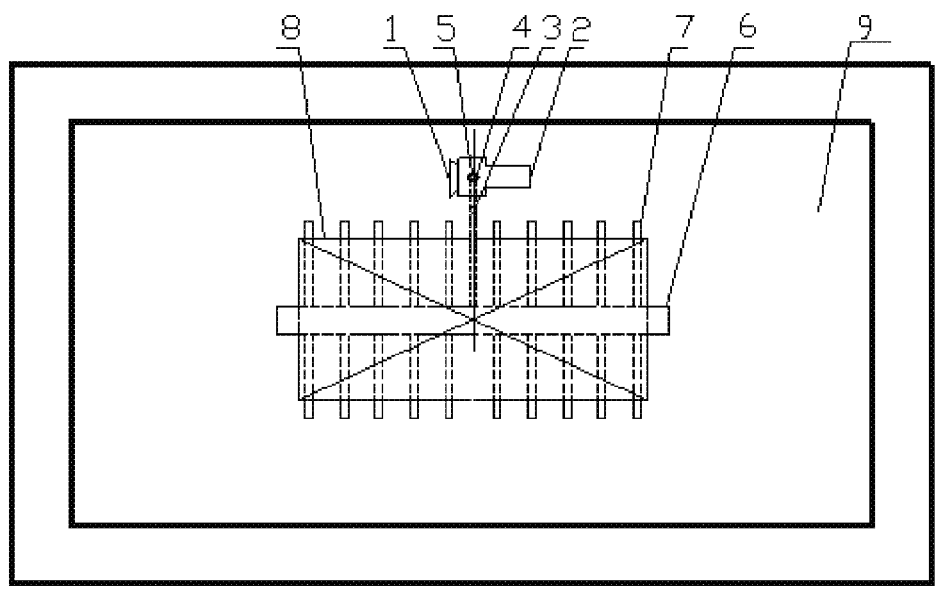
FIG. 4 is a top view of the jet aeration apparatus of FIG. 3.

As shown in FIGS. 3 and 4, provided is a jet aeration apparatus for aerating a membrane bioreactor 9 and having low energy consumption. The jet aeration apparatus is basically similar to Embodiment 1 in structure, performance, and aeration effect except that the pump 2 of the jet aerator is disposed at the side of the hollow fiber membrane module 8.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A jet aeration apparatus for aerating a membrane bioreactor, the jet aeration apparatus comprising a jet aerator and an air supply pipe,
    wherein
        said jet aerator is disposed in said membrane bioreactor and comprises a water inlet, a pump disposed below a liquid surface of said membrane bioreactor, an air inlet pipe whose air inlet is disposed above said liquid surface of said membrane bioreactor, and a jet pipe comprising a jet nozzle;
        said air supply pipe is disposed below a membrane module of said membrane bioreactor and comprises a connector;
        said connector of said air supply pipe is connected to said jet nozzle of said jet pipe of said jet aerator; and
        said air supply pipe further comprises a branch pipe and a drain pipe, said branch pipe having equal length and being disposed below said membrane module, and both ends of said drain pipe being closed and each side being connected to said branch pipe.

2. The jet aeration apparatus of claim 1, wherein said pump is disposed between said membrane modules or at the side of said membrane module.

3. The jet aeration apparatus of claim 1, wherein an air intake amount of said air inlet pipe is controlled by a ball valve.

4. The jet aeration apparatus of claim 1, wherein said water inlet is lower than a set low liquid level of said membrane bioreactor.

5. The jet aeration apparatus of claim 1, wherein said branch pipe is disposed in an equal interval.

6. The jet aeration apparatus of claim 5, wherein one end of said branch pipe is closed and the other end is connected to said drain pipe, and a line of aeration holes is disposed at both sides of said branch pipe, and an angle between said aeration hole and vertical line is ±44°-46°.

7. The jet aeration apparatus of claim 6, wherein a diameter of said aeration hole is 4-10 mm.

8. The jet aeration apparatus of claim 6, wherein said aeration hole is disposed 100-500 mm below the bottom of said membrane module.

9. The jet aeration apparatus of claim 6, wherein a distance between two aeration holes is 100-300 mm.

10. The jet aeration apparatus of claim 1, wherein said branch pipe is a corrosion resistant pipe.

11. The jet aeration apparatus of claim 1, wherein said drain pipe is a corrosion resistant pipe.

12. The jet aeration apparatus of claim 1, wherein said connector is a corrosion resistant connector.

13. A method of using the jet aeration apparatus of claim 1, comprising 1) pumping sludge and wastewater into said pump of said jet aerator to form a high speed of mixture flow so that a negative pressure are produced in said jet pipe;
2) controlling an air-water ratio of 4-15:1 to make air sucked in to said jet pipe due to said negative pressure to form a mixture comprising air, wastewater, and sludge; and
3) transporting said mixture via said air supply pipe and scouring against said membrane module.

* * * * *